United States Patent [19]

Park et al.

[11] Patent Number: 5,288,740
[45] Date of Patent: Feb. 22, 1994

[54] PROCESS FOR MAKING ALKENYL AROMATIC FOAM PACKING BODIES WITH CARBON DIOXIDE AND/OR ETHANE BLOWING AGENT SYSTEMS

[75] Inventors: Chung P. Park, Pickerington; Kyung W. Suh, Granville, both of Ohio

[73] Assignee: The Dow Chemical Company, Midland, Mich.

[21] Appl. No.: 59,718

[22] Filed: May 11, 1993

Related U.S. Application Data

[63] Continuation-in-part of Ser. No. 965,917, Oct. 23, 1992, abandoned.

[51] Int. Cl.$^5$ ............................. C08J 9/08; C08J 9/14
[52] U.S. Cl. ......................................... 521/58; 264/51; 264/143; 521/56; 521/60; 521/79; 521/97; 521/98
[58] Field of Search ............... 521/79, 58, 56, 60, 521/97, 98; 264/51, 143

[56] References Cited

U.S. PATENT DOCUMENTS

| | | | |
|---|---|---|---|
| 3,026,273 | 3/1962 | Engles | 521/79 |
| 3,121,132 | 2/1964 | Del Bene | 521/79 |
| 3,481,455 | 12/1969 | Graham et al. | 206/46 |
| 3,632,705 | 1/1972 | Makowski | 264/51 |
| 3,697,454 | 10/1972 | Trimble | 260/3.5 B |
| 3,723,237 | 3/1973 | Fuss | 161/168 |
| 3,819,544 | 6/1974 | Pillar et al. | 260/2.5 B |
| 3,855,053 | 12/1974 | Fuss | 161/168 |
| 3,932,569 | 1/1976 | Fuss | 264/51 |
| 4,269,895 | 5/1981 | Borchert et al. | 428/402 |
| 4,424,287 | 1/1984 | Johnson et al. | 521/74 |
| 4,455,272 | 6/1984 | Schubert et al. | 264/53 |
| 4,599,269 | 7/1986 | Kohaut et al. | 428/397 |
| 4,621,022 | 11/1986 | Kohaut et al. | 428/397 |
| 4,657,715 | 4/1987 | Myers et al. | 264/45.5 |
| 5,110,836 | 5/1992 | Harclerode et al. | 521/58 |
| 5,110,837 | 5/1992 | Harclerode et al. | 521/58 |

*Primary Examiner*—Morton Foelak
*Attorney, Agent, or Firm*—J. Robert Dean, Jr.

[57] ABSTRACT

Disclosed is a process for making closed-cell, alkenyl aromatic polymer foam packing bodies. An alkenyl aromatic polymer material is heated to form a melt polymer material. The melt polymer material comprises greater than 50 percent by weight alkenyl aromatic monomeric units. A blowing agent is incorporated into the melt polymer material at an elevated pressure to form a foamable gel. The blowing agent has about 20 weight percent or more based upon the total weight of the first blowing agent selected from the group consisting of carbon dioxide and ethane. The foamable gel is extruded through a die to form a foam strand. The foam strand is pelletized to form a plurality of foam bodies. The bodies are further expanded by exposing them one or more times to heated air or steam. Preferably, the bodies are allowed to age for a preselected period of time after pelletizing and between subsequent expansions. The use of carbon dioxide and/or ethane as blowing agents allows the reduction or elimination of certain blowing agents classified as volatile organic contaminants, which are currently being employed commercially.

Further disclosed is a process for making an article formed from the foam packing bodies. Further disclosed is a process for making discrete foam strands.

29 Claims, No Drawings

PROCESS FOR MAKING ALKENYL AROMATIC FOAM PACKING BODIES WITH CARBON DIOXIDE AND/OR ETHANE BLOWING AGENT SYSTEMS

This application is a continuation-in-part of Ser. No. 07/965,917 filed Oct. 23, 1992, now abandoned, which is incorporated herein by reference.

BACKGROUND OF THE INVENTION

This invention relates to a process for making foam packing bodies with environmentally-acceptable blowing agent systems.

Lightweight low density materials have commonly been used as packing materials. Such materials commonly include foamed plastics, wood, and paperboard. The materials are commonly utilized in the form of small, discrete bodies for reasons of handling, convenience, even distribution, and enhanced cushioning. Discrete bodies of foamed materials are commonly referred to as foam packing peanuts or loose-fill.

For environmental reasons, it is desirable to reduce or eliminate in processes for making foam packing bodies certain blowing agents which may accelerate formation of smog or depletion of ozone. Such smog-forming blowing agents include n-butane, isobutane, n-pentane, and isopentane. These blowing agents are commonly referred to as volatile organic compounds (VOCs) in governmental regulations. Accordingly, it would be desirable to reduce or eliminate the use of VOCs in making foam packing bodies.

SUMMARY OF THE INVENTION

According to the present invention, there is a process for making closed-cell, alkenyl aromatic polymer foam packing bodies. An alkenyl aromatic polymer material is heated to form a melt polymer material. The melt polymer material comprises greater than 50 percent by weight alkenyl aromatic monomeric units. A blowing agent is incorporated into the melt polymer material at an elevated pressure to form a foamable gel. The blowing agent has about 20 weight percent or more based upon the total weight of the first blowing agent selected from the group consisting of carbon dioxide and ethane. The foamable gel is extruded through a die to a zone of reduced pressure to form a foam strand. The foam strand is pelletized to form a plurality of foam bodies. Alternately, the foamable gel may be extruded through the die to foam an essentially continuous foamable gel strand, which is pelletized to form discrete gel strands. The discrete gel strands are then allowed to expand or foam to form packing bodies. Preferably, the bodies are further expanded by exposing them one or more times to heated air or steam. Preferably, the bodies are allowed to age for a preselected period of time after pelletizing and between subsequent expansions. The use of carbon dioxide and/or ethane as a blowing agent allows the reduction or elimination of blowing agents classified as VOCs, which are currently employed commercially.

Further according to the present invention, there is a process for making an article formed of discrete, closed-cell, alkenyl aromatic polymer foam packing bodies. The process comprises heating the alkenyl aromatic polymer material described above to form a melt polymer material; forming a foamable gel by incorporating into the melt polymer material at an elevated pressure the blowing agent described above; extruding the foamable gel through a die to a region of reduced pressure to form a foam strand; pelletizing the foam strand to form a plurality of the discrete foam bodies; further expanding the foam bodies by exposing them one or more times to heated air or steam; and molding and coalescing the foam bodies to form an article.

Further according to the present invention, there is a process for making discrete, closed-cell alkenyl aromatic polymer foam strands. The process comprises heating the alkenyl aromatic polymer material described above to form a melt polymer material; forming a foamable gel by incorporating into the melt polymer material at an elevated pressure the blowing agent described above; extruding the foamable gel through a die to a region of reduced pressure to form an essentially continuous foam strand; further expanding the continuous foam strand by exposing it to heated air or steam; and intermittently severing the continuous foam strand to form a plurality of discrete foam strands. The discrete foam strands useful in cushion packing or heat insulating applications. The discrete foam strand is not limited with regard to size or shape of cross-section. The discrete foam strands may take a plank form commonly associated with rectangular foam boards useful in heat insulating applications.

Further according to the present invention, there is a process for making discrete, closed-cell alkenyl aromatic polymer foam strands. The process comprises heating the alkenyl aromatic polymer material described above to form a melt polymer material; forming a foamable gel by incorporating into the melt polymer material at an elevated pressure the blowing agent described above; extruding the foamable gel through a die to a region of reduced pressure to form an essentially continuous foam strand; intermittently severing the continuous foam strand to form a plurality of discrete foam strands; and further expanding the discrete foam strands by exposing them to one or more times to heated air or steam. Optionally, the foam strands may further be allowed to age in air for a preselected period of time after severing and prior to further expansion of the foam strands. The discrete foam strands are useful in the applications described above.

DETAILED DESCRIPTION

The present foam structure comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{1-4}$ alkyl acids and esters, ionomeric derivatives, and $C_{2-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred structures comprise substantially (i.e. greater than 95 percent) and most preferably entirely of polystyrene because polystyrene is economical, and is commonly employed in insulating plastic foam.

The alkenyl aromatic polymer material has a glass transition temperature ($T_g$) of about 110° C. or less and preferably about 100° C. or less. A polymer material with a $T_g$ above about 110° C. will be sluggish in expanding with such steam. The $T_g$ of the polymer material may be adjusted to the above levels by selection of copolymer content, molecular weight, or the addition of a plasticizer. Suitable plasticizers include those known in the art such as mineral oil. Suitable copolymers include those having a glass transition temperature of about 100° C. or less such as styrene-butyl acrylate copolymer.

An important feature of the present invention is the use of carbon dioxide and/or ethane as blowing agents. The use of carbon dioxide and/or ethane permits reduction of certain commercially-employed blowing agents classified as VOCs.

Surprisingly, it was found possible to make foam packing bodies using carbon dioxide and/or ethane and still achieve desirable foam body densities (less than 16 kilograms per cubic meter ($kg/m^3$)). This was surprising because carbon dioxide and ethane tend to have significantly lower solubilities and higher diffusivities in alkenyl aromatic polymers than blowing agents currently commercially employed, such as n-butane, isobutane, n-pentane, isopentane. A blowing agent substantially comprising the above butanes or pentanes was previously thought to be necessary since the partial pressure of such agents was used to expand the bodies upon multiple exposures to heated air or steam to achieve desirable densities. Since carbon dioxide and ethane diffuse from the foam much more quickly than the butanes or the pentanes, it was thought foam bodies made with carbon dioxide and/or ethane could not expand to a degree sufficient to achieve desirable densities since the cells of the foam would be substantially free of blowing agent and filled with atmospheric air.

Blowing agents useful in blowing agent mixtures with carbon dioxide and/or ethane in making the present foam structure include inorganic agents, organic blowing agents and chemical blowing agents. Suitable inorganic blowing agents include nitrogen, argon, water, air, nitrogen, and helium. Organic blowing agents include aliphatic hydrocarbons having 1-9 carbon atoms, aliphatic alcohols having 1-3 carbon atoms, and fully and partially halogenated aliphatic hydrocarbons having 1-4 carbon atoms. Aliphatic hydrocarbons include methane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

A preferred blowing agent systems comprises carbon dioxide and/or ethane along with one or more co-blowing agents such as water, or any of the aforementioned aliphatic hydrocarbons having 1-9 carbon atoms, aliphatic alcohols having 1-3 carbon atoms and fully and partially aliphatic hydrocarbons having 1-4 carbon atoms. Preferably, the co-agent has greater solubility in the alkenyl aromatic polymer material to provide a larger cell size than that attainable with carbon dioxide and/or ethane alone. Further preferably, the co-agent has lower diffusivity through the alkenyl aromatic polymer than carbon dioxide and/or ethane to assist in subsequent expansion of the foam body. A blowing agent comprised entirely of carbon dioxide and water is desirable because of its entirely inorganic content. A preferred blowing agent, however, is a mixture of carbon dioxide with isobutane or isopentane. The blowing agent comprises about 20 percent by weight or more of carbon dioxide and/or ethane based upon the total weight of the blowing agent. The blowing agent may also comprise about 50 percent or more by weight carbon dioxide and/or ethane based upon the total weight of the blowing agent. The blowing agent may also be composed entirely of carbon dioxide and/or ethane.

The amount of blowing agent incorporated into the polymer melt material to make a foam-forming polymer gel is from about 0.2 to about 5.0, preferably from about 0.5 to about 3.0, and most preferably from about 1.0 to 2.50 moles per kilogram of polymer.

An apparatus for making the foam bodies generally comprises a blending means, a die, a cutter or pelletizer, and an expander.

The blending means melts or plasticizes the polymer material and mixes various additives, including the blowing agent, under pressure to form a foamable plastic gel. The blending means further cools the gel to an optimum foaming temperature prior to conveying it through the die. The cooling may take place during or subsequent to blending. The blending means further conveys or delivers the foamable gel through the die to a region of reduced or lower pressure than that within the blending means to form a continuous strand of the foamable gel or a foam. The blending of various components of the foamable gel may be accomplished according to known techniques in the art such as with an extruder, mixer, or other suitable blending means or device. Blending and cooling of the polymer, any additives, and the blowing agent may take place in a single extruder, a tandem extruder, or an extruder in combination with one or more separate mixers and coolers. The polymer, additives, and blowing agent may be added in same or different extruders or mixers.

The die orifice may take any cross-sectional shape known in the art such as an "S" shape used in manufacturing PELASPAN-PAC® loose-fill material (THE DOW CHEMICAL COMPANY). Other cross-sectional shapes include discs, cylinders, spheres, and the like.

The cutter or pelletizer intermittently severs or pelletizes the continuous strand of foamable gel into a multiplicity of discrete bodies or pellets of foamable gel. The cutter or pelletizer may be any means known in the art for cutting such as a knife edge. After the pellets exit the cutter or pelletizer, they are allowed to complete their expansion. The discrete bodies of foamable gel are then allowed to expand to form foam bodies. Alternately, the continuous strand of foamable gel may be allowed to partially or completely expand prior to being pelletized into foam bodies. The positioning of the pelletizer relative to the die may be adjusted to achieve negligible, partial, or complete foaming prior to pelletizing. The closer to the die, the lower degree of foaming.

The foam bodies may be exposed to heat one or more times to effect further expansion. The temperature of the pellets may be raised by any means known in the art such as exposure to heat or a heat source such as steam or heated air. Preferably, the pellets are exposed to steam in order to expand them. The pellets are placed in a steam chest or chamber until the desired degree of expansion is obtained, and then they are removed and allowed to cool and cure. About 24 hours later, the foamed body is again exposed to steam and further expanded, and then removed and allowed to cool and cure. Maximum expansion of the pellets into foam bodies is obtained by expanding them a multiple number of times, preferably about four times.

The foam body preferably has a density lower than 16 kilograms per cubic meter ($kg/m^3$). The foam has an average cell size of from 0.03 to 2.0 millimeters according to ASTM D3576.

The present foam body is substantially closed cell. The present foam is preferably less than 5 percent and more preferably less than 2 percent open cell according to ASTM D2856-A.

Various additives may be incorporated in the foam body such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

Though the foam body is primarily useful for loose-fill applications, a plurality of the foam bodies may be molded and coalesced or adhered to form articles of various shapes such as insulation board. The foam body also may be ground into scrap for use as blown insulation.

The following are examples of the present invention, and are not to be construed as limiting. Unless otherwise indicated, all percentages, parts, or proportions are by weight.

EXAMPLES

Foam bodies were prepared according to the present invention. Foam bodies having desirable cell size, open-cell content, and density were successfully prepared.

EXAMPLE 1

The extruder used was a 25 mm (1 inch (in)) screw-type having additional zones for mixing and cooling at the end of usual sequential zones of feeding, melting, and metering. An opening for blowing agents was provided on the extruder barrel between the metering and mixing zones. A die orifice of rectangular shape was attached to the end of the cooling zone. The height of the opening, hereinafter called the die gap, was adjustable while its width was fixed at 3.68 mm (0.145 in).

A granular crystal polystyrene having a weight average molecular weight of about 230,000 containing 2.5 weight percent mineral oil (Dow Styron 666D) according to size exclusion chromatography was extruded at a uniform rate of 2.27 kilograms/hour (kg/hr) (5 pounds/hour (1 b/hr)). The temperatures of the extruder zones were 99° C. at feeding zone, 160° C. at both melting and metering zones, 200° C. at extruder zone. A hydrocarbon blowing agent and carbon dioxide were separately injected by syringe pumps into blowing agent port. The blowing agent levels were 0.14 g-moles/100 grams of polymer (mph) in Tests 1.1 through 1.4 and 0.13 mph in Tests 1.5 and 1.6. The temperatures of the cooling zone and the die were adjusted to cool the gel (homogeneous polymer/blowing agent mixture) to the optimum foam expansion. The optimum foaming temperatures of the gels ranged from 122° C. to 123° C. When the optimum foaming temperature was reached, the die gap was adjusted so the largest foam free of prefoaming was achieved. The die gap was adjusted to provide a good foam at each blowing agent composition. At a die gap ranging from 0.41–0.51 mm (0.016–0.020 in), good quality foams having approximately oval cross-sections of 7.1–10.7 mm (0.28–0.42 in) in short diameter and 14.5–16.5 mm (0.57–0.65 in) in long diameters were produced. As shown in Table 1, the foams have relatively low densities of 33–41 $kg/m^3$ (2.1–2.6 pcf) and small cell sizes of 0.058–0.25 mm.

The foams were subjected to secondary expansions to achieve lower densities. The expansions were conducted with both freshly prepared (less than 15 minutes after extrusion) foam and the one day-old foam. While the one day-old foam had a substantial amount of air diffused therein, the fresh foam was almost free of air. The secondary expansions were performed as follows: the foam strands were cut to about 3.8 centimeter (cm) (1.5 in) in length and expanded in atmospheric steam for three minutes, and aged at ambient temperature for one day so that air could diffuse in. After weights and volumes were determined, the foams were again exposed to steam for one minute and aged for one day. This second expansion and aging scheme was repeated during subsequent expansions.

As the density data set forth in Table 1 illustrates, all of the foam specimens expanded well in steam reaching a minimum density after two to four expansions. One day-old foams reached lower densities than the fresh foams. Densities are comparable to or in some cases lower than those of current commercial loose-fill materials, which typically ranges from 6.4–9.6 kg/m$^3$ (0.4–0.6 pcf). Attaining a foam density as low as 5.0 kg/m$^3$ (Test 1.4b) with a blowing agent consisting of 50 percent carbon dioxide was very surprising.

TABLE 1

PHYSICAL PROPERTIES OF FOAMS OF EXAMPLE 1

| TEST NO. | BA TYPE[1] | BA RATIO[2] | CELL SIZE[3] | OPEN CELL[4] | FOAM AGE[5] | FOAM DENSITY[6] | FOAM DENSITY AFTER EXPANSION[7] | | | | |
|---|---|---|---|---|---|---|---|---|---|---|---|
| | | | | | | | 1× | 2× | 3× | 4× | 5× |
| 1.1a | iC$_5$/CO$_2$ | 80/20 | 0.62 | 1.7 | 0 | 35.2 | 15.9 | 9.3 | 8.2 | 15.1 | 19.2 |
| 1.1b | iC$_5$/CO$_2$ | 80/20 | 0.62 | 1.7 | 1d | 30.7 | 7.4 | 4.6 | 11.4 | 18.3 | 22.7 |
| 1.2a | iC$_5$/CO$_2$ | 50/50 | 0.07 | 0 | 0 | 37.3 | 30.7 | 17.9 | 10.6 | 9.0 | 14.3 |
| 1.2b | iC$_5$/CO$_2$ | 50/50 | 0.07 | 0 | 1d | 33.9 | 23.9 | 12.8 | 8.7 | 11.5 | 21.1 |
| 1.3a | iC$_4$/CO$_2$ | 80/20 | 0.09 | 0.3 | 0 | 35.2 | 18.4 | 9.9 | 23.4 | 16.8 | 17.0 |
| 1.3b | iC$_4$/CO$_2$ | 80/20 | 0.09 | 0.3 | 1d | 35.5 | 12.3 | 9.9 | 6.7 | 16.8 | 24.8 |
| 1.4a | iC$_4$CO$_2$ | 50/50 | 0.06 | 0.1 | 0 | 41.4 | 31.7 | 24.3 | 5.4 | 6.1 | 11.1 |
| 1.4b | iC$_4$/CO$_2$ | 50/50 | 0.06 | 0.1 | 1d | 41.2 | 22.7 | 5.0 | 11.2 | 9.9 | 13.9 |
| 1.5a | iC$_4$/nC$_5$/CO$_2$ | 30/20/50 | 0.25 | 0 | 0 | 42.3 | 30.1 | 19.9 | 15.1 | 13.6 | 18.3 |
| 1.5b | iC$_4$/nC$_5$/CO$_2$ | 30/20/50 | 0.25 | 0 | 1d | 36.8 | 24.8 | 16.3 | 10.6 | 9.1 | 15.4 |
| 1.6a | iC$_4$/iC$_5$/CO$_2$ | 30/20/50 | 0.08 | 1.9 | 0 | 39.1 | 21.1 | 13.8 | 9.6 | 9.0 | 16.5 |
| 1.6b | iC$_4$/iC$_5$/CO$_2$ | 30/20/50 | 0.08 | 1.9 | 1d | 38.0 | 18.7 | 12.5 | 8.8 | 10.9 | 21.5 |

[1] iC$_4$ = isobutane, iC$_5$ = isopentane, nC$_5$ = normal pentane, CO$_2$ = carbon dioxide
[2] Molar ratio of the blowing agents
[3] Cell size in millimeters determined per ASTM D3576
[4] Open cell content in percentage determined per ASTM D2856-A
[5] Age of the foam body when the secondary expansion test was initiated: 0 = fresh foam, 1d = 1 day-old foam
[6] Density of foam body as extruded in kilograms per cubic meter
[7] Density of foam body after secondary expansions in kilograms per cubic meter: 1× = first pass, 2× = second pass and so forth

TABLE 2

FOAM DENSITIES OF FOAMS OF EXAMPLE 2

| FOAM AGE[1] | FOAM DENSITY AFTER EXPANSION[2] | | | | |
|---|---|---|---|---|---|
| | 1× | 2× | 3× | 4× | 5× |
| 0 | 25.1 | 17.5 | 15.2 | 14.9 | 14.6 |
| 1d | 18.9 | 14.9 | 13.8 | 13.0 | 13.0 |

[1] Age of the foam body when the secondary expansion test was started: 0 = fresh foam, 1d = 1 day-old foam
[2] Density of foam body after secondary expansions in kilograms per cubic meter: 1× = first pass, 2× = second pass and so forth

EXAMPLE 2

The apparatus used was the same as in Example 1. A 90/10 blend by weight of crystal polystyrene with a 88.2/11.8 (by weight) copolymer of styrene and n-butyl acrylate (SBA) was expanded with a 30/20/50 by mole mixture of isobutane/isopentane/carbon dioxide. Both the polystyrene and SBA copolymer had weight average molecular weight of approximately 200,000 according to size exclusion chromatography. The SBA copolymer has a glass transition temperature ($T_g$) of about 88° C., while the crystal polystyrene has a $T_g$ of about 107° C. The SBA copolymer functions as a plasticizer. $T_g$ was determined by differential scanning calorimetry (DSC) at a heating rate of 20° C./min.

Extrusion and secondary steam expansion procedures were substantially the same as in Example 1. The extruder zones were set at the same temperatures as in Example 1 except for the cooling zone. The blowing agent level was maintained at 0.13 mph. The gel was uniformly cooled to about 133° C. in the cooling zone. At a die gap of 0.46 mm (0.018 in), a good foam of 13.7 mm×5.2 mm (0.54 in×0.21 in) oval cross-section was made. The foam had a cell size of 0.07 mm, density of 34.6 kg/m$^3$, and open cell content of 4.5 percent. The high foaming temperature apparently caused this relatively high level of open cells. As shown in Table 2, the foam did not expand as well as those in Example 1. Still, the foam reaches a sufficiently low density after multiple expansions.

EXAMPLE 3

The apparatus and crystal polystyrene used were as in Example 1. The blowing agent used was ethane and an 80/20 by mole mixture of ethane/ethanol. The apparatus was operated substantially as in Example 1. The extruder zones were set at the same temperatures as in Example 1 except for the cooling zone. The cooling zone brought the gel temperature down to 132° C. and 136° C. for Tests 3.1 and 3.2, respectively. The blowing agents were injected into the injection port so that the total level became 0.10 mpg. At a die gap of 0.41 mm (0.016 in), good foams of 17 mm×7.4 mm (0.65 in×0.29 in) and 16 mm×8.4 mm (0.63 in×0.33 in) oval cross-section were made. The secondary expansion scheme was substantially the same as in Example 1 except that the first pass (first expansion in steam) was carried out for 1.5 minutes, and only one day-old foams were tested.

As shown in Table 3, the foam expanded with ethane further expands in steam to a minimum of 16.5 kg/m$^3$. The foam density is not as low as those achieved in Example 1, but is low enough for a loose-fill material. The comparatively low degree of expansion with the ethane-blown foam is attributable to the high permeation rate and lack of plasticizing effect with ethane. Adding a small amount of ethanol to ethane in Test 3.2 improves the steam expandability of the foam. The ethane/ethanol-blown foam undergoes expansion to 13.3 kg/m$^3$ even though the foam contains a higher level of open cells. Though not held to any particular theory, it is believed that ethanol acts as a hydrophilic plasticizer for polystyrene.

TABLE 3

PHYSICAL PROPERTIES OF FOAMS OF EXAMPLE 3

| TEST NO. | BA TYPE[1] | BA RATIO[2] | CELL SIZE[3] | OPEN CELL[4] | FOAM DENSITY[6] | FOAM DENSITY AFTER EXPANSION[7] | | | | |
|---|---|---|---|---|---|---|---|---|---|---|
| | | | | | | 1× | 2× | 3× | 4× | 5× |
| 3.1 | ethane | 100 | 0.30 | 0.7 | 34.3 | 23.4 | 16.5 | 20.1 | 23.2 | 25.9 |
| 3.2 | ethane/EtOH | 80/20 | 0.12 | 2.1 | 32.3 | 22.6 | 17.7 | 13.9 | 13.3 | 13.9 |

[1]EtOH = ethanol
[2-7]Same as in Table 1

EXAMPLE 4

The apparatus and its operating procedures were substantially the same as in Example 1. The 90/10 crystal polystyrene/SBA copolymer blend of Example 2 was foamed with a 75/25 by mole mixture of ethane and ethanol. The blowing agent was injected at a rate of 0.08 mph. At a gel temperature of 141° C. and die gap of 0.46 mm (0.018 in), a good foam having 19.3 mm×11.2 mm (0.76 in×0.44 in) oval cross-section was produced. The foam had a density of 41.0 kg/m³, cell size of 0.5 mm, and contained 2.8 percent open cells. The foam was subjected to secondary expansions according to the schedule of Example 3. The foam density was progressively lowered to 21.5, 14.9, 13.0, 12.2, and 10.7 kg/m³ after one through five passes, respectively. This foam example demonstrated that lowering the $T_g$ of a base polymer material enables a foam to undergo greater secondary expansion in steam.

In the following examples, foam bodies were prepared according to the process of the present invention. The blowing agent was a mixture of carbon dioxide and water.

EXAMPLE 5

The apparatus employed comprised a blending means and a gap-adjustable die orifice having a gap width of 6.35 mm (0.25 in) in series. A granular crystal polystyrene having weight average molecular weight of about 180,000 according to size exclusion chromatography was uniformly mixed with 0.1 pph hexabromocyclododecane (HBCD) flame retardant and 0.05 pph calcium as a process aid. The blending means operated at a rate of approximately 3.63 kg/hr (8 lb/hr) based on the weight of the polymer melt. Predetermined amounts of carbon dioxide and water were injected into the polymer melt to form a foamable gel. The gel was cooled down to an optimum foaming temperature. The die opening was adjusted to provide a good foam at each blowing agent composition. The die pressure was maintained above 7.1 megapascals (MPa). As shown in Table 5, good foams substantially free of open cells were achieved at all different levels of carbon dioxide. The foams had densities of 29–30 kg/m³ and cell sizes as large as 2.0 mm. The foams had oval cross-sections of approximately 0.8–1.2 cm in one diameters and 2.5–3.2 cm in the other diameters.

After aging at an ambient temperature for a few days, the foam strands were cut to about 2 cm-long specimens and subjected to secondary expansions in atmospheric steam. The multiple secondary expansions were done as follows. The specimens were first exposed to steam for two minutes for expansion and aged for one day so that air could diffuse in. After their weights and volumes were determined, the foam specimens were again exposed to steam for one minute and aged for one day. This second expansion and aging scheme was repeated during the subsequent expansions. As the density data set forth in Table 5 show, all of the foam specimens expanded progressively in steam reaching densities as low as 12 kg/m³ after the fourth expansion. The highly expanded materials are suitable for loose-fill applications.

TABLE 5

PHYSICAL PROPERTIES OF FOAMS OF EXAMPLE 5

| TEST NO. | CO₂ LEVEL[1] | H₂O LEVEL[2] | CELL SIZE[3] | OPEN CELL[4] | FOAM DENS[5] | FOAM DENSITY AFTER EXPANSION[6] | | | |
|---|---|---|---|---|---|---|---|---|---|
| | | | | | | 1× | 2× | 3× | 4× |
| 5.1 | 0.49 | 1.0 | 2.0 | 0 | 30 | 21 | 17 | 14 | 12 |
| 5.2 | 0.70 | 1.0 | 2.0 | 0 | 29 | 21 | 16 | 13 | 12 |
| 5.3 | 0.86 | 1.0 | 0.41 | 0 | 30 | 20 | 16 | 14 | 12 |

[1]Gram-moles of carbon dioxide mixed in per one kilogram of polymer
[2]Gram-moles of water mixed in per one kilogram of polymer
[3]Cell size in millimeters determined per ASTM D3576
[4]Open cell content in percentage determined per ASTM D2856-A
[5]Density of foam body as extruded in kilograms per cubic meter
[6]Density of foam body after secondary expansions in kilograms per cubic meter; 1× = first pass, 2× = second pass and so forth

EXAMPLE 6

Except for the blowing agent composition, the same apparatus, operating procedure, polymer and additives are used as in Example 5. The die opening was adjusted to produce good quality foams. Good quality foams having substantially closed cells were produced by extrusion at an optimum foaming temperature. The foams had about 0.9 cm ×2.5 cm oval cross-sections and relatively small cells. As shown in Table 6, the foams expanded well to low densities during secondary expansions.

TABLE 6

PHYSICAL PROPERTIES OF FOAMS OF EXAMPLE 6

| TEST NO. | $CO_2$ LEVEL[1] | $H_2O$ LEVEL[2] | CELL SIZE[3] | OPEN CELL[4] | FOAM DENS[5] | FOAM DENSITY AFTER EXPANSION[6] | | | |
|---|---|---|---|---|---|---|---|---|---|
| | | | | | | 1× | 2× | 3× | 4× |
| 6.1 | 0.89 | 0.29 | 0.27 | 2 | 40 | 23 | 17 | 15 | 13 |
| 6.2 | 0.86 | 0.79 | 0.23 | 2 | 32 | 21 | 17 | 14 | 12 |

[1-6]Same as in Table 5

EXAMPLE 7

Foam bodies were made by substantially the same procedure as Example 5 with a $CO_2/H_2O$ blowing agent having a higher level of carbon dioxide and carbon dioxide as a sole blowing agent.

As set forth in Table 7a, in comparing Tests 7.2 and 7.3, the open cell content was reduced when a higher level carbon dioxide was incorporated, but the cell size was very small. Even in Test 7.1 where water is also used, the relatively high level of carbon dioxide resulted in small cell size.

In addition to the same secondary expansion scheme of Example 5, a pressurization and expansion test was applied to the foams. The foam specimens were impregnated with air in a chamber pressurized to about 15 pounds per square inch gauge (psig) (100 kilopascals gauge) overnight, and then subjected to expansion in steam for two minutes. One of the expanded specimens was impregnated with air while the other was aged at an ambient temperature. The next day, both specimens were expanded again in atmospheric steam for one minute. The expansion data for non-pressurized and pressurized foam speciments are presented in Tables 7a and 7b, respectively.

As shown in Table 7a, the fine-cell foams do expand in steam during multiple exposures but to the lesser degrees than the foams made in Examples 5 and 6. The foam made in Test 7.3 containing 34 percent open cells exhibits poor expandability. Air impregnation aids in foam expansion as shown in Table 7b especially during the first expansion. However, the partially open-cell foam in Test 7.3 does not reach a desirable low density. The test results indicate that a very small cell size and open cells are detrimental to secondary expansion in steam.

TABLE 7a

PHYSICAL PROPERTIES OF NON-PRESSURIZED FOAMS OF EXAMPLE 7

| TEST NO. | $CO_2$ LEVEL[1] | $H_2O$ LEVEL[2] | CELL SIZE[3] | OPEN CELL[4] | FOAM DENS[5] | FOAM DENSITY AFTER EXPANSION[6] | | | |
|---|---|---|---|---|---|---|---|---|---|
| | | | | | | 1× | 2× | 3× | 4× |
| 7.1 | 0.97 | 0.51 | 0.07 | 1 | 35 | 24 | 20 | 17 | 16 |
| 7.2 | 1.52 | — | 0.05 | 4 | 37 | 28 | 25 | 22 | 19 |
| 7.3* | 1.21 | — | 0.07 | 34 | 38 | 34 | 30 | 29 | 30 |

*Not an example of this invention
[1-6]Same as in Table 5

TABLE 7b

PHYSICAL PROPERTIES OF PRESSURIZED FOAMS OF EXAMPLE 7

| TEST NO. | FOAM DENSITY AFTER EXPANSION | | |
|---|---|---|---|
| | 1×[1] | 2×[2] | 3×[3] |
| 7.1 | 17 | 15 | 20 |
| 7.2 | 19 | 16 | 17 |
| 7.3* | 24 | 23 | 24 |

*Not an example of this invention
[1]Density of foam body after the first expansion after the foam specimen was impregnated with 15 psig air in kilograms per cubic meter
[2]Density of foam body after the second expansion after the first expansion specimen was impregnated with 15 psig air in kilograms per cubic meter
[3]Density of foam body after the second expansion after the first expansion specimens aged at atmospheric pressure for one day in kilograms per cubic meter

EXAMPLE 8

Ninety parts by weight of the granular crystal polystyrene of Examples 5 and 6 was uniformly mixed with 10 parts by weight of a 94/6 by weight styrene/butyl acrylate (SBA) copolymer having 290,000 molecular weight according to size exclusion chromatography. Blended with the polymer were 0.1 parts by weight of hexabromocyclododecane (HBCD) flame retardant and 0.05 parts by weight of calcium stearate, a process aid. The blending means operated at a rate of approximately 3.63 kg/hr (8 lbs/hr) based upon the weight of the polymer melt. The homogenized gel of polymer, additives, and blowing agent was cooled to an optimum foaming temperature prior to conveying the mixture through the die. The die gap was adjusted to provide foam strands free from prefoaming.

At 135° C. gel temperature, good foams were produced in both tests. Both the $CO_2/H_2O$ binary blowing agent and $CO_2$ sole blowing agent provided good quality foams having a substantially closed-cell structure. The foams were subjected to the secondary expansion tests of Example 5. As shown in Table 8, both foams expanded reasonably well. It may be noted that the polymer blend containing a lower-$T_g$ SBA copolymer makes a good foam with $CO_2$ blowing agent. The formulation provided a foam having relatively larger cells than Tests 7.2 and 7.3 above, and such foams expanded well in steam.

TABLE 8
PHYSICAL PROPERTIES OF FOAMS OF EXAMPLE 8

| TEST NO. | $CO_2$ LEVEL[1] | $H_2O$ LEVEL[2] | CELL SIZE[3] | OPEN CELL[4] | FOAM DENS[5] | FOAM DENSITY AFTER EXPANSION[6] | | | |
|---|---|---|---|---|---|---|---|---|---|
| | | | | | | 1× | 2× | 3× | 4× |
| 8.1 | 1.30 | — | 0.13 | 2 | 36 | 22 | 17 | 14 | 12 |
| 8.2 | 0.90 | 0.50 | 0.27 | 1 | 38 | 26 | 22 | 19 | 18 |

[1]–[6]Same as in Table 5

While embodiments of the process of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making discrete, closed-cell, alkenyl aromatic polymer foam packing bodies, comprising:
    a) heating an alkenyl aromatic polymer material comprising greater than 50 percent by weight alkenyl aromatic monomeric units to form a melt polymer material;
    b) forming a foamable gel by incorporating into the melt polymer material at an elevated pressure a blowing agent having about 20 weight percent or more based upon the total weight of the blowing agent of a first blowing agent selected from the group consisting of carbon dioxide, ethane, and a mixture of the foregoing;
    c) extruding the formable gel through a die to a region of reduced pressure to form an alkenyl aromatic polymer foam strand;
    d) pelletizing the foam strand to form a plurality of the discrete foam bodies; and
    e) further expanding the foam bodies by exposing them one or more times to heated air or steam.

2. The process of claim 1, wherein the bodies are allowed to age in air for pre-selected periods of time after pelletizing and between subsequent expansions.

3. The process of claim 1, wherein the blowing agent has a second blowing agent comprising a $C_3$–$C_6$ hydrocarbon.

4. The process of claim 1, wherein the blowing agent has a second blowing agent comprising water.

5. The process of claim 1, wherein the alkenyl aromatic polymer material comprises greater than 70 percent by weight alkenyl aromatic monomeric units.

6. The process of claim 1, wherein the foam bodies have an open-cell content less than 5 percent.

7. The process of claim 1, wherein the foam bodies have a density of less than 16 kilograms per cubic meter.

8. The process of claim 1, wherein an alkenyl aromatic polymer material has a glass transition temperature of about 110° C. or less.

9. The process of claim 1, wherein the first blowing agent comprises about 50 percent or more based upon the total weight of the blowing agent.

10. The process of claim 1, wherein the blowing agent is composed entirely of the first blowing agent.

11. The process of claim 1, wherein the blowing agent is composed entirely of carbon dioxide and water.

12. The process of claim 8, wherein the alkenyl aromatic material further comprises a plasticizer or an alkenyl aromatic copolymer having a glass transition temperature of about 100° C. or less.

13. A process for making discrete, closed-cell, alkenyl aromatic polymer foam packing bodies, comprising:
    a) heating an alkenyl aromatic polymer material comprising greater than 50 percent by weight alkenyl aromatic monomeric units to form a melt polymer material;
    b) forming a foamable gel by incorporating into the melt polymer material at an elevated pressure a blowing agent having about 20 weight percent or more based upon the total weight of the blowing agent of a first blowing agent selected from the group consisting of carbon dioxide, ethane, and a mixture of the foregoing;
    c) extruding the foamable gel through a die to form an essentially continuous strand of the foamable gel;
    d) pelletizing the foamable gel strand to form a plurality of discrete gel strands;
    e) allowing the plurality of the discrete gel strands to expand in a region of reduced pressure to form a plurality of the discrete foam bodies; and
    f) further expanding the foam bodies by exposing them one or more times to heated air or steam.

14. The process of claim 13, wherein the bodies are allowed to age in air for pre-selected periods of time after pelletizing and between subsequent expansions.

15. The process of claim 13, wherein the blowing agent has a second blowing agent comprising a $C_3$–$C_6$ hydrocarbon.

16. The process of claim 13, wherein the blowing agent has a second blowing agent comprising water.

17. The process of claim 13, wherein the alkenyl aromatic polymer material comprises greater than 70 percent by weight alkenyl aromatic monomeric units.

18. The process of claim 13, wherein the foam bodies have an open-cell content less than 5 percent.

19. The proces of claim 13, wherein the foam bodies have a density of less than 16 kilograms per cubic meter.

20. The process of claim 13, wherein an alkenyl aromatic polymer material has a glass transition temperature of about 110° C. or less.

21. The process of claim 13, wherein the first blowing agent comprises about 50 percent or more based upon the total weight of the blowing agent.

22. The process of claim 13, wherein the blowing agent is composed entirely of the first blowing agent.

23. The process of claim 13, wherein the blowing agent is composed entirely of carbon dioxide and water.

24. The process of claim 20, wherein the alkenyl aromatic material further comprises a plasticizer or an alkenyl aromatic copolymer having a glass transition temperature of about 100° C. or less.

25. A process for making an article formed of discrete, closed-cell, alkenyl aromatic polymer foam packing bodies, comprising:
    a) heating an alkenyl aromatic polymer material comprising greater than 50 percent by weight alkenyl aromatic monomeric units to form a melt polymer material;
b) forming a foamable gel by incorporating into the melt polymer material at an elevated pressure a blowing agent having about 20 weight percent or more based upon the total weight of the blowing agent of a first blowing agent selected from the group consisting of carbon dioxide, ethane, and a mixture of the foregoing;
c) extruding the foamable gel through a die to a region of reduced pressure to form an alkenyl aromatic polymer foam strand;
d) pelletizing the foam strand to form a plurality of the discrete foam bodies;
e) further expanding the foam bodies by exposing them one or more times to heated air or steam; and
f) molding and coalescing the foam bodies to form an article.

26. The process of claim 25, wherein the bodies are allowed to age in air for preselected periods of time after pelletizing and between subsequent expansions prior to molding and coalescing to form the article.

27. A process for making discrete, closed-cell, alkenyl aromatic polymer foam strands, comprising:
a) heating an alkenyl aromatic polymer material comprising greater than 50 percent by weight alkenyl aromatic monomeric units to form a melt polymer material;
b) forming a foamable gel by incorporating into the melt polymer material at an elevated pressure a blowing agent having about 20 weight percent or more based upon the total weight of the blowing agent of a first blowing agent selected from the group consisting of carbon dioxide, ethane, and a mixture of the foregoing;
c) extruding the foamable gel through a die to a region of reduced pressure to form an essentially continuous foam strand;
d) further expanding the continuous foam strand by exposing it to heated air or steam; and
e) intermittently severing the continuous foam strand to form a plurality of discrete foam strands.

28. A process for making discrete, closed-cell, alkenyl aromatic polymer foam strands, comprising:
a) heating an alkenyl aromatic polymer material comprising greater than 50 percent by weight alkenyl aromatic monomeric units to form a melt polymer material;
b) forming a foamable gel by incorporating into the melt polymer material at an elevated pressure a blowing agent having about 20 weight percent or more based upon the total weight of the blowing agent of a first blowing agent selected from the group consisting of carbon dioxide, ethane, and a mixture of the foregoing;
c) extruding the foamable gel through a die to a region of reduced pressure to form an essentially continuous foam strand;
d) intermittently severing the continuous foam strand to form a plurality of discrete foam strands; and
e) further expanding the discrete foam strands by exposing them one or more times to heated air or steam.

29. The process of claim 27, wherein the foam strands are allowed to age in air for a preselected period of time after severing and prior to further expansion of the foam strands.

* * * * *